(12) United States Patent
Nguyen et al.

(10) Patent No.: US 12,197,350 B2
(45) Date of Patent: Jan. 14, 2025

(54) LOW-LATENCY INPUT DATA STAGING TO EXECUTE KERNELS

(71) Applicant: Samsung Electronics Co., Ltd., Suwon-si (KR)

(72) Inventors: Marie Mai Nguyen, Pittsburgh, PA (US); Rekha Pitchumani, Oak Hill, VA (US); Yang Seok Ki, Palo Alto, CA (US); Krishna Teja Malladi, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/586,770

(22) Filed: Jan. 27, 2022

(65) Prior Publication Data

US 2023/0185740 A1 Jun. 15, 2023

Related U.S. Application Data

(60) Provisional application No. 63/288,518, filed on Dec. 10, 2021.

(51) Int. Cl.
*G06F 13/16* (2006.01)
*G06F 9/30* (2018.01)
*G06F 13/42* (2006.01)

(52) U.S. Cl.
CPC ...... *G06F 13/1668* (2013.01); *G06F 9/30043* (2013.01); *G06F 9/30047* (2013.01); *G06F 13/1663* (2013.01); *G06F 13/4221* (2013.01)

(58) Field of Classification Search
CPC ............. G06F 13/1663; G06F 13/1668; G06F 13/4221; G06F 9/30043; G06F 9/30047

USPC .......................................................... 711/154
See application file for complete search history.

(56) References Cited

U.S. PATENT DOCUMENTS

| | | | |
|---|---|---|---|
| 7,532,119 B2 | 5/2009 | Bratkovski et al. |
| 8,433,695 B2 | 4/2013 | Wu et al. |
| 8,607,005 B2 | 12/2013 | Boyd et al. |
| 8,725,946 B2 | 5/2014 | Petersen et al. |
| 9,235,353 B2 | 1/2016 | Iwamitsu et al. |
| 9,478,274 B1 | 10/2016 | Michaud et al. |
| 10,255,190 B2 | 4/2019 | Loh |
| 10,310,980 B2 | 6/2019 | Kalwitz |
| 10,437,479 B2 | 10/2019 | Haghighi et al. |
| 10,503,641 B2 | 12/2019 | Boyer et al. |
| 10,649,927 B2 | 5/2020 | Raghava et al. |
| 10,896,136 B2 | 1/2021 | Bae et al. |

(Continued)

FOREIGN PATENT DOCUMENTS

| | | |
|---|---|---|
| CN | 109460369 A | 3/2019 |
| KR | 20210124082 A | 10/2021 |
| WO | 2020190797 A1 | 9/2020 |

OTHER PUBLICATIONS

European Extended Search Report for Application No. 22208258.8, mailed Mar. 31, 2023.

(Continued)

*Primary Examiner* — Christopher B Shin
(74) *Attorney, Agent, or Firm* — Renaissance IP Law Group LLP

(57) ABSTRACT

An accelerator is disclosed. A tier storage may store data. A circuit may process the data to produce a processed data. The accelerator may load the data from a device using a cache-coherent interconnect protocol.

17 Claims, 10 Drawing Sheets

(56) References Cited

U.S. PATENT DOCUMENTS

| | | | |
|---|---|---|---|
| 10,915,445 | B2 | 2/2021 | Gandhi et al. |
| 11,023,380 | B2 | 6/2021 | Sharon et al. |
| 11,030,126 | B2 | 6/2021 | Koufaty et al. |
| 11,061,591 | B2 | 7/2021 | Bae et al. |
| 11,068,397 | B2 | 7/2021 | Gou et al. |
| 11,087,206 | B2 | 8/2021 | Schwartz et al. |
| 11,163,684 | B1 | 11/2021 | Gray et al. |
| 11,194,723 | B2 | 12/2021 | Saeki |
| 11,200,169 | B2 | 12/2021 | Fu et al. |
| 11,231,930 | B2 | 1/2022 | Gu et al. |
| 11,372,762 | B2 | 6/2022 | Narsale |
| 11,372,763 | B2 | 6/2022 | Narsale et al. |
| 11,379,374 | B2 | 7/2022 | Pinto |
| 11,416,397 | B2 * | 8/2022 | Natu ............. G06F 11/0778 |
| 11,494,312 | B2 | 11/2022 | Chien et al. |
| 11,513,960 | B2 | 11/2022 | Song |
| 11,645,365 | B2 * | 5/2023 | Luo ............. G06F 9/3877 706/26 |
| 11,709,783 | B1 * | 7/2023 | Chen ............. G06N 20/00 710/26 |
| 2015/0234746 | A1 | 8/2015 | Jo |
| 2018/0300238 | A1 | 10/2018 | Vembu et al. |
| 2018/0300600 | A1 | 10/2018 | Ma et al. |
| 2018/0314249 | A1 | 11/2018 | Appu et al. |
| 2019/0102292 | A1 | 4/2019 | Agarwal et al. |
| 2019/0102311 | A1 | 4/2019 | Gupta et al. |
| 2019/0303297 | A1 | 10/2019 | Fleming, Jr. et al. |
| 2020/0004685 | A1 | 1/2020 | Guim Bernat et al. |
| 2020/0026556 | A1 | 1/2020 | Chitlur et al. |
| 2020/0142753 | A1 * | 5/2020 | Harwood ............. G06F 9/4856 |
| 2020/0328879 | A1 | 10/2020 | Makaram et al. |
| 2021/0019069 | A1 | 1/2021 | Sen et al. |
| 2021/0089445 | A1 | 3/2021 | Wang et al. |
| 2021/0117249 | A1 | 4/2021 | Doshi et al. |
| 2021/0133123 | A1 | 5/2021 | Feehrer et al. |
| 2021/0157500 | A1 | 5/2021 | Gu et al. |
| 2021/0157593 | A1 | 5/2021 | Gu et al. |
| 2021/0192287 | A1 | 6/2021 | Dwivedi et al. |
| 2021/0224213 | A1 | 7/2021 | Raj et al. |
| 2021/0240655 | A1 | 8/2021 | Sharma |
| 2021/0271680 | A1 | 9/2021 | Lee et al. |
| 2021/0303470 | A1 | 9/2021 | Virani et al. |
| 2021/0311739 | A1 | 10/2021 | Malladi et al. |
| 2021/0318966 | A1 | 10/2021 | Chhabra et al. |
| 2022/0261349 | A1 | 8/2022 | Kim et al. |
| 2022/0405206 | A1 | 12/2022 | Sreedhar et al. |
| 2023/0004318 | A1 | 1/2023 | Zhang et al. |
| 2023/0022544 | A1 * | 1/2023 | Willhalm ............. G06F 13/1668 |
| 2023/0027648 | A1 * | 1/2023 | Chang ............. G06F 16/24552 |
| 2023/0057633 | A1 | 2/2023 | Nguyen et al. |
| 2023/0067601 | A1 | 3/2023 | Walker |
| 2023/0068529 | A1 | 3/2023 | Walker |
| 2023/0100586 | A1 * | 3/2023 | Kakaiya ............. G06F 9/3877 717/102 |
| 2023/0114242 | A1 * | 4/2023 | Lin ............. G06F 12/0815 711/141 |
| 2023/0119126 | A1 * | 4/2023 | Liu ............. G06N 3/063 706/15 |
| 2023/0121992 | A1 * | 4/2023 | Kim ............. G11C 7/1093 365/191 |
| 2023/0132931 | A1 * | 5/2023 | Greathouse ............. G06F 13/28 711/154 |
| 2023/0153168 | A1 * | 5/2023 | Abali ............. H04L 9/0637 718/102 |
| 2023/0169015 | A1 * | 6/2023 | Punniyamurthy .... G06F 12/126 711/122 |

OTHER PUBLICATIONS

Fang, Jian et al., "In-Memory Database Acceleration on FPGAs: A Survey," The VLDB Journal 29, 2019, pp. 33-59.

Office Action for U.S. Appl. No. 17/586,767, mailed Mar. 31, 2023.

Singh, Gagandeep et al., "FPGA-Based Near-Memory Acceleration of Modern Data-Intensive Applications," IEEE Micro, vol. 41, No. 4, 2021, pp. 39-48.

Final Office Action for U.S. Appl. No. 17/586,767, mailed Jul. 20, 2023.

Notice of Allowance for U.S. Appl. No. 17/586,767, mailed Nov. 9, 2023.

Corrected Notice of Allowability for U.S. Appl. No. 17/586,767, mailed Feb. 22, 2024.

* cited by examiner

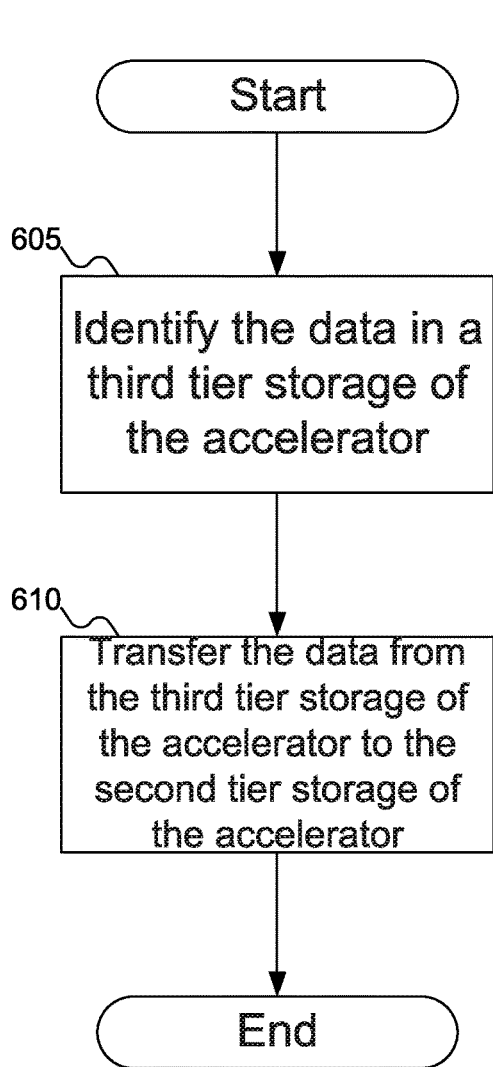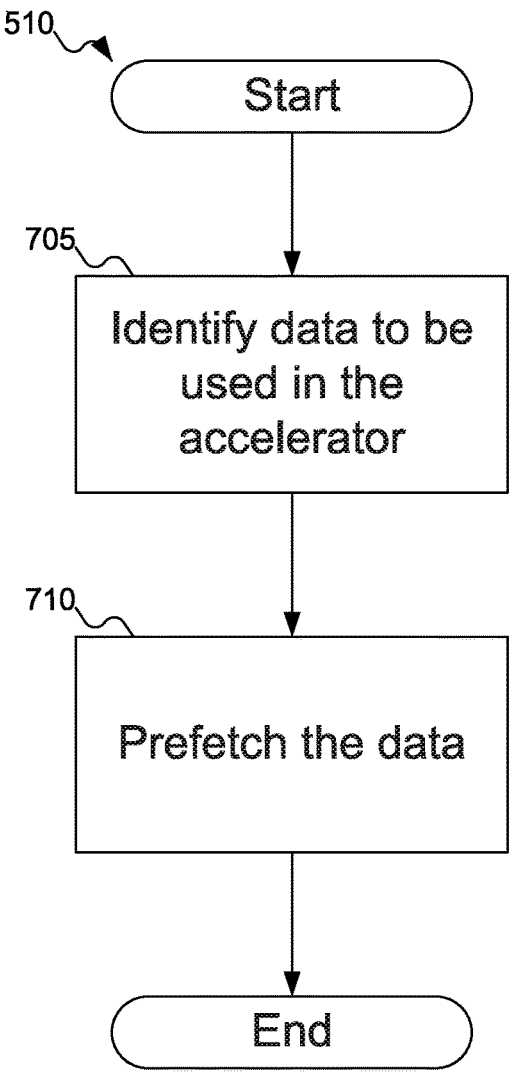
FIG. 6
FIG. 7

LOW-LATENCY INPUT DATA STAGING TO EXECUTE KERNELS

RELATED APPLICATION DATA

This application claims the benefit of U.S. Provisional Patent Application Ser. No. 63/288,518, filed Dec. 10, 2021, which is incorporated by reference herein for all purposes.

This application is related to U.S. patent application Ser. No. 17/586,767, filed Jan. 27, 2022, which claims the benefit of U.S. Provisional Patent Application Ser. No. 63/288,513, filed Dec. 10, 2021, both of which are incorporated by reference herein for all purposes.

FIELD

The disclosure relates generally to accelerators, and more particularly to reducing the time required to load input data into an accelerator.

BACKGROUND

Models, such as machine learning models, tend to be very large. Some models may include terabytes of data, and model sizes may be expected to increase over time. Accelerators may execute models: for example, to produce data for machine learning analysis of later data.

A need remains to improve the input of data into an accelerator.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 6 shows a flowchart of an example procedure to transfer data between the tiers of FIG. 3, according to embodiments of the disclosure.

FIG. 7 shows a flowchart of an example procedure for the prefetcher of FIG. 3 to prefetch data, according to embodiments of the disclosure.

SUMMARY

Figure 1:
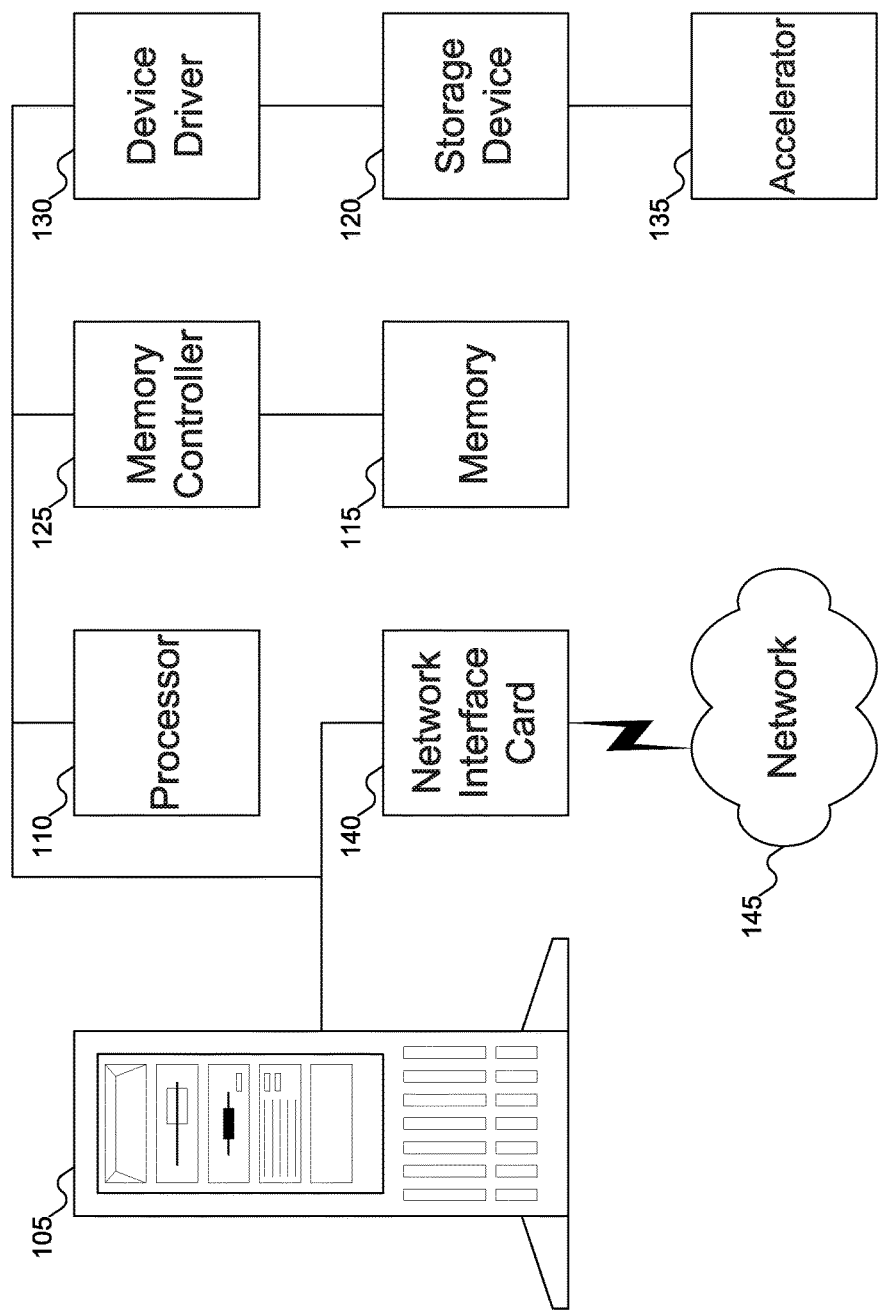
FIG. 1 shows a machine including an accelerator to support concurrent execution of models, according to embodiments of the disclosure.

Embodiments of the disclosure include an accelerator. The accelerator may use a cache-coherent interconnect protocol, such as a Compute Express Link (CXL) protocol, to transfer data into the accelerator.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Accelerators, which may include Field Programmable Gate Arrays (FPGAs), Application-Specific Integrated Circuits (ASICs), or other processing hardware, may be used to execute various models. One example of such a model is a machine learning (ML) model. By processing an ML model, the machine may be capable of recognizing and handling data received at a later time. Accelerators may include multiple processing cores, capable of processing multiple models concurrently.

Sometimes, data may be pre-processed before the accelerator uses the data. This pre-processing may be handled by the accelerator itself or by the host processor. But transferring the data into the accelerator may involve multiple copy operations, which may delay the operation of the accelerator.

Embodiments of the disclosure address these problems by enabling the host to access the accelerator memory. By writing the data directly from the host processor into the accelerator memory, rather than storing the data in host memory and copying the data from the host memory into the accelerator memory, fewer operations may be needed, reducing the amount of time needed to transfer the data to the accelerator.

Further, by permitting the accelerator to access data from the source, the host processor and host memory may be bypassed, which may expedite operations.

FIG. 1 shows a machine including an accelerator to support concurrent execution of models, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure.

Machine 105 may also include accelerator 135 (which may also be termed a device). As discussed below, accelerator 135 may support execution of models such as Machine Learning (ML) models, and may support concurrent execution of multiple models. Accelerator 135 may be implemented using any desired hardware. For example, accelerator 135, or components thereof, may be implemented using a Field Programmable Gate Array (FPGA), an Application-Specific Integrated Circuit (ASIC), a central processing unit (CPU), a graphics processing unit (GPU), a general purpose GPU (GPGPU), a data processing unit (DPU), a neural processing unit (NPU), a tensor processing unit (TPU), or a system-on-a-chip (SoC), to name a few possibilities. Accelerator 135 may also use a combination of these elements to implement accelerator 135.

Machine 105 may also include network interface card 140, which may support a connection to network 145. In addition to data being stored in memory 115 and/or storage device 120, some data to be used by accelerator 135 may be accessed from network interface card 140 or from a network address across network 145. Network 145 may be any variety of network, including a local area network (LAN), wide area network (WAN), metropolitan area network (MAN), or a global network such as the Internet. In addition, network interface card 140 may support communication with network 145 using a wired connection such as Ethernet, a wireless connection such as the various wireless connections known as Wi-Fi and described in various standards, such as the Institute of Electrical and Electronics Engineers (IEEE) 802.11 standards (which may include the IEEE 802.11 a/b/g/n/ac/ax standards).

Figure 2:
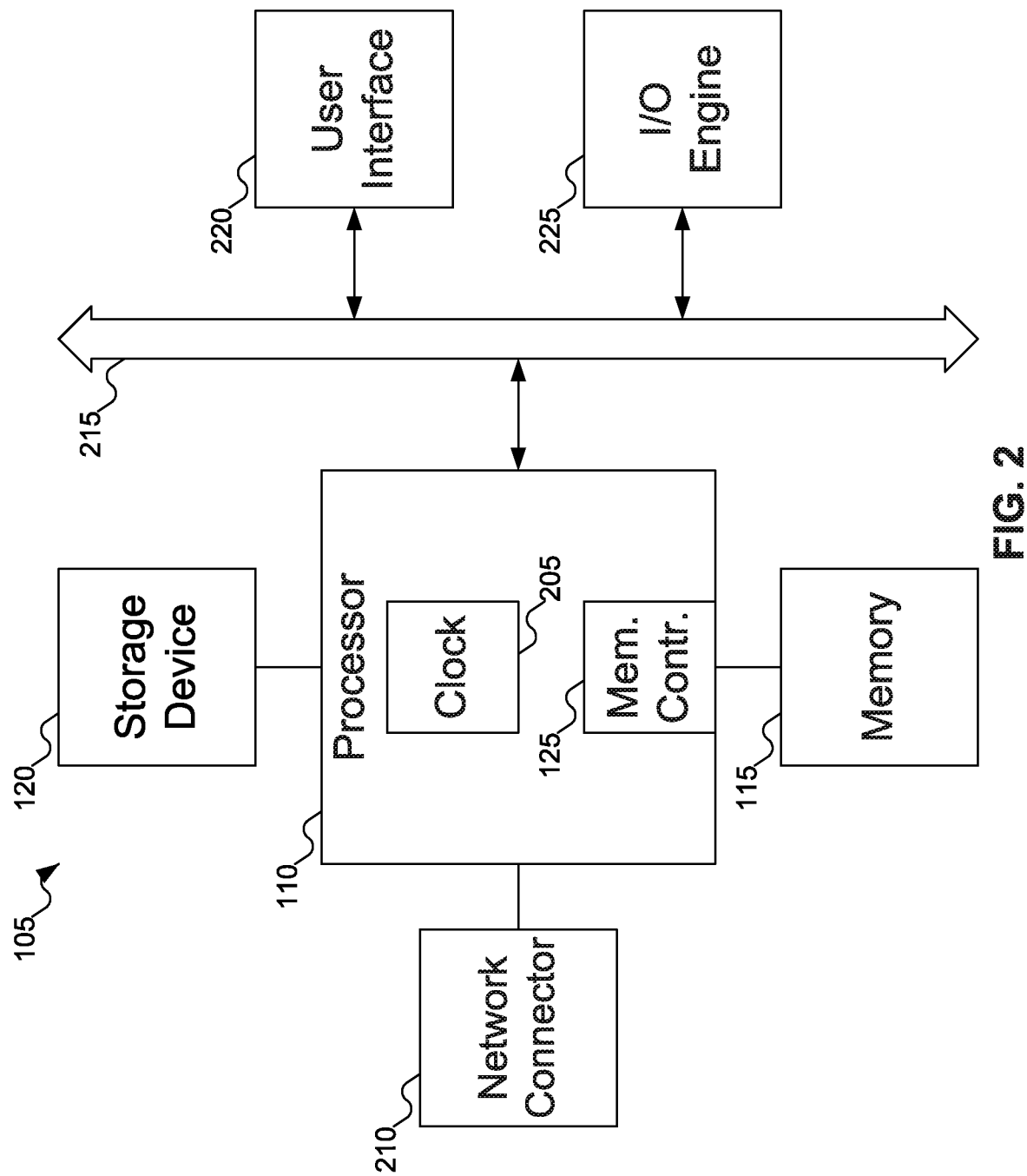
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
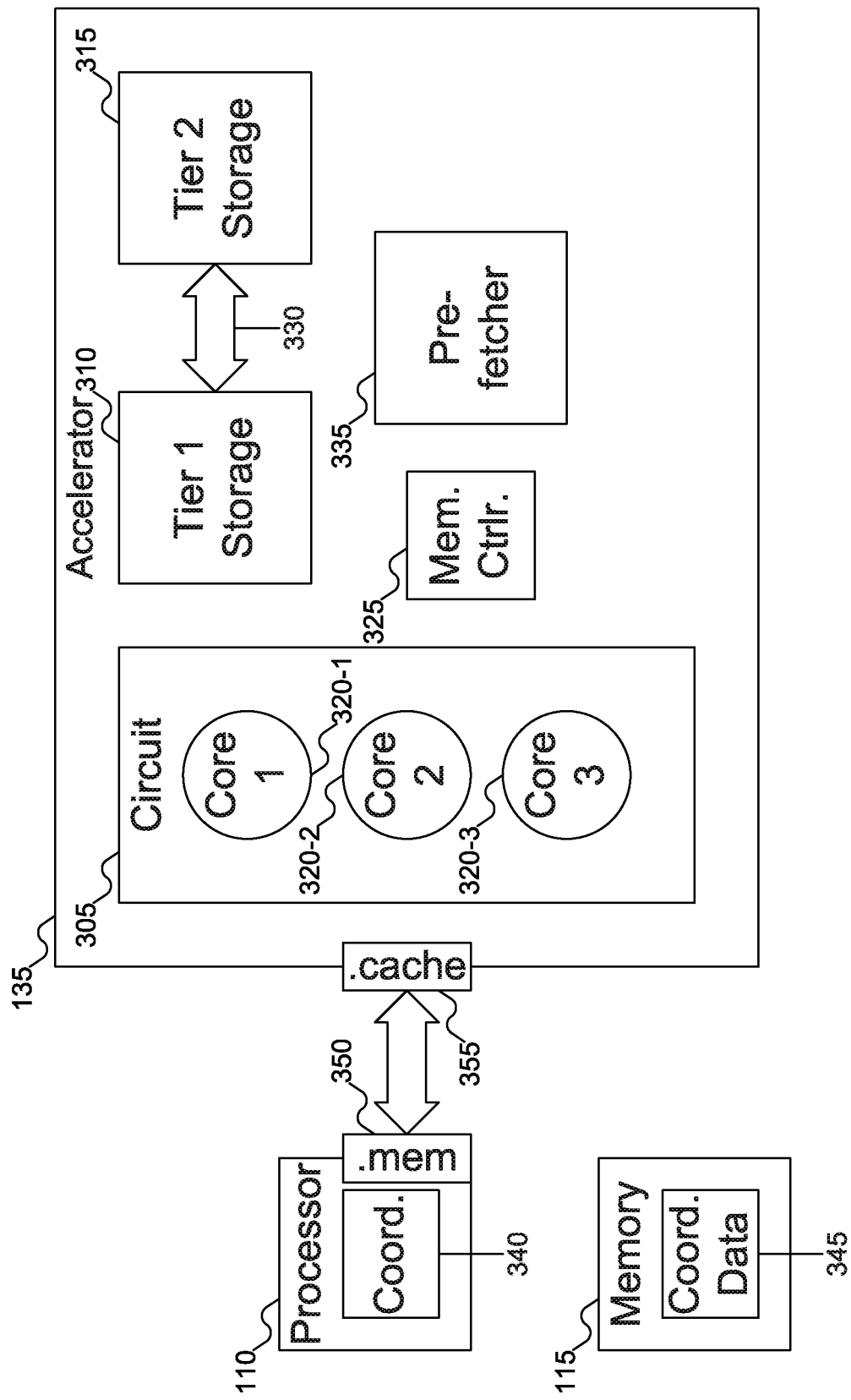
FIG. 3 shows details of the accelerator of FIG. 1, according to embodiments of the disclosure.

FIG. 3 shows details of accelerator 135 of FIG. 1, according to embodiments of the disclosure. In FIG. 3, accelerator 135 may include circuit 305, first tier storage 310, and second tier storage 315. Circuit 305 may be considered the processing heart of accelerator 135, and may perform execution of the various models. To that end, circuit 305 may include cores 320-1 through 320-3 (which may be referred to collectively as cores 320). Cores 320 may be portions of circuit 305 that may execute various instructions, similar to cores in processors and GPUs currently in use. Each core 320 may execute a kernel of an operating system and an application on top of that kernel: the applications may execute the models. Each core 320 may operate independently of other cores. Some or all of cores 320 may share some data, or each core 320 may execute using different data. Some or all of cores 320 may execute the same instructions, or each core 320 may execute different instructions. Further, each core 320 may operate concurrently to other cores 320: for example, the operations in core 320-1 might not affect operations in core 320-2. While FIG. 3 shows three cores 320, embodiments of the disclosure may include any number (one or more) of cores, limited only by what the available hardware may implement.

First tier storage 310 and second tier storage 315 may be different storage options within accelerator 135. For example, first tier storage 310 may be a form of memory, similar to memory 115, and may be implemented using DRAM or SRAM, among other options. When first tier storage 310 is implemented as a form of memory, accelerator 135 may include memory controller 325 to manage writing data to first tier storage 310 and reading data from first tier storage 310, similar to memory controller 125 of FIG. 1. Other options for first tier storage 310 may include on-chip storage, such as a processor cache within circuit 305 (which may be shared among cores 320, or each core 320 may have its own processor cache), or a storage device such as a hard disk drive or SSD.

Second tier storage 315 may be similar to first tier storage 310, In general, second tier storage 315 may be larger in capacity than first tier storage 310, but may have a higher latency (that is, may take longer to access data) than first tier storage 310. That is, second tier storage 315 may store more data than first tier storage 310, but it may take longer to access data from second tier storage 315 than from first tier storage 310. As with first tier storage 310, second tier storage 315 may be a form of memory, a storage device such as a hard disk drive or SSD, or other forms of storage. Note that in embodiments of the disclosure where second tier storage 315 is a storage device, storage device 120 of FIG. 1 may be omitted.

Connecting first tier storage 310 and second tier storage 315 may be high bandwidth bus 330. High bandwidth bus 330 may enable transferring large amounts of data between first tier storage 310 and second tier storage 315 quickly.

To understand the benefits of high bandwidth bus 330, it is helpful to understand how data may be transferred into first tier storage 310, and in particular to understand how large amounts of data, such as Machine Learning models, may be transferred into first tier storage 310. Because such models may be large, they may be stored on storage device 120 of FIG. 1, rather than in memory 115. One way to transfer data between storage device 120 of FIG. 1 and first tier storage 310 is to have storage device 120 of FIG. 1 read the data into a memory (such as a RAM) of storage device 120 of FIG. 1. As mentioned above, since the models may be large, it may be that first tier storage 310 might only have enough room to store a single model, in which case only one model might be read into a memory of storage device 120 of FIG. 1. This data may then be copied from the memory of storage device 120 of FIG. 1 into memory 115. Processor 110 may then access this data from memory 115 and transfer this data into first tier storage 310 over a bus connecting processor 110 and accelerator 135. Thus, transferring data into first tier storage 310 may involve three copy operations: a first copy operation to copy the data into the memory of storage device 120 of FIG. 1, a second copy operation to copy the data into memory 115, and a third copy operation to copy the data into first tier storage 310.

Further, when the data is copied into memory 115, it is important that the data stay in memory 115 so that it may be copied to first tier storage 310. But in systems that use virtual paging, some pages in memory 115 may be copied to storage device 120 of FIG. 1, much like pages in a processor cache may be expelled from the cache to make room for new data. If the pages storing the data to be copied to first tier storage 310 were expelled in this manner, these pages would have to be restored to memory 115 before the copy operation into first tier storage 310 may be performed. Thus, processor 110 may ensure that the pages where the data are written are pinned memory: using pinned memory may add further delay to the overall process of copying data into first tier storage 310.

As noted above, since models may be large, it might only be possible to transfer one model into first tier storage 310. But if there is only one model in first tier storage 310, then circuit 305 may only process that one model, eliminating the benefits of concurrent model processing.

Another way to transfer data between storage device 120 of FIG. 1 and first tier storage 310 is to use technologies that may permit direct transfer of the data between storage device 120 of FIG. 1 and first tier storage 310. While this process may be faster than the process described above, as it may eliminate one copy operation, the data may be still be transferred across a PCIe bus between storage device 120 of FIG. 1 and first tier storage 310, and the bandwidth limits of the PCIe bus, plus the fact that the PCIe bus may be shared with other components, may limit how fast the data may be transferred. Further, even with this process it may be possible to transfer only one model at a time to first tier storage 310, again eliminating the benefits of concurrent model processing.

Using high bandwidth bus 330, on the other hand, may permit more data to be transferred between first tier storage 310 and second tier storage 315 in a given amount of time. The higher bandwidth may permit data to be transferred faster, expediting execution of the models. It may also be possible to transfer data for more than one model in a given amount of time, better leveraging the availability of cores 310. Further, if high bandwidth bus 330 is dedicated to transferring data between first tier storage 310 and second tier storage 315, then there is no concern about other data being sent across high bandwidth bus 330, limiting the amount of data that may be transferred between first tier storage 310 and second tier storage 315.

While FIG. 3 shows two tiers of storage 310 and 315, embodiments of the disclosure may include any number (one or more) of tiers of storage. For example, accelerator 135 may include a third tier storage that is larger in capacity than second tier storage 315, but slower to access than second tier storage 315.

In addition to circuit 305, first tier storage 310, second tier storage 315, memory controller 325, and high bandwidth bus 330, accelerator 135 may also include prefetcher 335. Prefetcher 335 may be used to prefetch data from second tier storage 315 into first tier storage 310 in anticipation of the data being needed. The operation of prefetcher 335 is discussed further with reference to FIG. 4 below.

In some embodiments of the disclosure, processor 110 may include coordinator 340. Coordinator 340 may be used to coordinate the execution of models by circuit 305. For example, coordinator 340 may specify what data will be used next in the execution of the model, and may arrange for that data to be transferred from second tier storage 315 into first tier storage 310. Coordinator 340 may also start execution of the model in circuit 305 when the data has been loaded into first tier storage 310. Coordinator 340 may use coordinator data 345 in memory 115 to track the executions of the various models and what data is being processed.

While FIG. 3 shows coordinator 340 in processor 110 and coordinator data 345 in memory 115, embodiments of the disclosure may have accelerator 135 perform its own coordination. That is, rather than having processor 110 coordinate execution of the models, accelerator 135 may use one (or more) of cores 320 to perform the operations of coordinator 340, and first tier storage 310 may store coordinator data 345.

In some embodiments of the disclosure, accelerator 135 may process data for a model immediately. But in some embodiments of the disclosure, some data may need to be preprocessed before accelerator 135 may execute a model. This preprocessing may be performed either by processor 110 or by circuit 305 (or one or more of cores 320). The form this preprocessing takes may depend on the data, and any form of preprocessing is intended to be covered by this disclosure: indeed, preprocessing may be considered as just another form a processing by accelerator 135, except that the data may be processed more than once (once to complete the "preprocessing", and once again to process that "preprocessed" data). The processing itself may be thought of as taking an input data d and preprocessing it to produce data d'.

The data in question may be located at a number of sources: memory 115, in a memory in network interface card 140 of FIG. 1, at a network address across network 145 of FIG. 1, in storage device 120 of FIG. 1, or in first tier storage 310 or second tier storage 315, among other possibilities. These various sources may be divided into two categories. Some sources, such as memory 115, in a memory in network interface card 140 of FIG. 1, at a network address across network 145 of FIG. 1, or in storage device 120 of FIG. 1, may be thought of as sources outside accelerator 135 (since the data is not currently stored in accelerator 135); other sources, such as in first tier storage 310 or second tier storage 315, may be thought of as sources inside accelerator 135. The difference between these categories lies primarily in the process of making the data accessible to accelerator 135: data from sources inside accelerator 135 may be directly accessible by circuit 305, whereas data from sources outside accelerator 135 may involve transferring data into accelerator 135. Note that, regardless of whether the source is inside accelerator 135 or outside accelerator 135, the data in question may be stored on some physical device. For example, data accessed from a network address across network 145 of FIG. 1 may stored on some device (among other possibilities, a memory, a storage device, or a network interface card) to which the network address is assigned.

If processor 110 is to perform the preprocessing, then the data to be transferred into accelerator 135 may be the preprocessed data, whereas if accelerator 135 is to perform the preprocessing and the data is not currently in accelerator 135, then the data (prior to preprocessing) may be transferred into accelerator 135. But in either of these cases, some data may be transferred into accelerator 135.

Rather than using pinned memory and input/output commands to transfer data between processor 110 and accelerator 135, accelerator 135 may support the use of a cache-coherent interconnect protocol, such as the Compute Express Link (CXL) protocol. The CXL protocol may provide a mechanism, such as the CXL.mem protocol (shown as .mem 350 in FIG. 3), whereby processor 110 may directly access first tier storage 310 (and possibly second tier storage 315) within accelerator 135 without using other input/output commands. In addition, the CXL protocol may provide a mechanism, such as the CXL.cache protocol (shown as .cache 355 in FIG. 3), whereby accelerator 135 may access data from memory 115 or other sources outside accelerator 135 (such as data in storage device 120 of FIG. 1, data in a memory in network interface card 140 of FIG. 1, or data at a network address across network 145 of FIG. 1). For data accessed from storage device 120 of FIG. 1, a memory in network interface card 140 of FIG. 1, or at a network address across network 145 of FIG. 1, the use of a cache-coherent interconnect protocol may enable accelerator 135 to access the data without the data being placed in or manipulated by processor 110 or memory 115. In some embodiments of the disclosure, the cache-coherent interconnect protocol may also be used to access data in second tier storage 315.

The use of a cache-coherent interconnect protocol may support maintaining coherency between multiple versions of the same data: if data in memory 115 is also in first tier storage 310, then an update to the data in one location may result in the data in the other location being similarly updated. The use of a cache-coherent interconnect protocol may provide for a more efficient transfer of data into accelerator 135, regardless of the data in question or its source.

Figure 4:
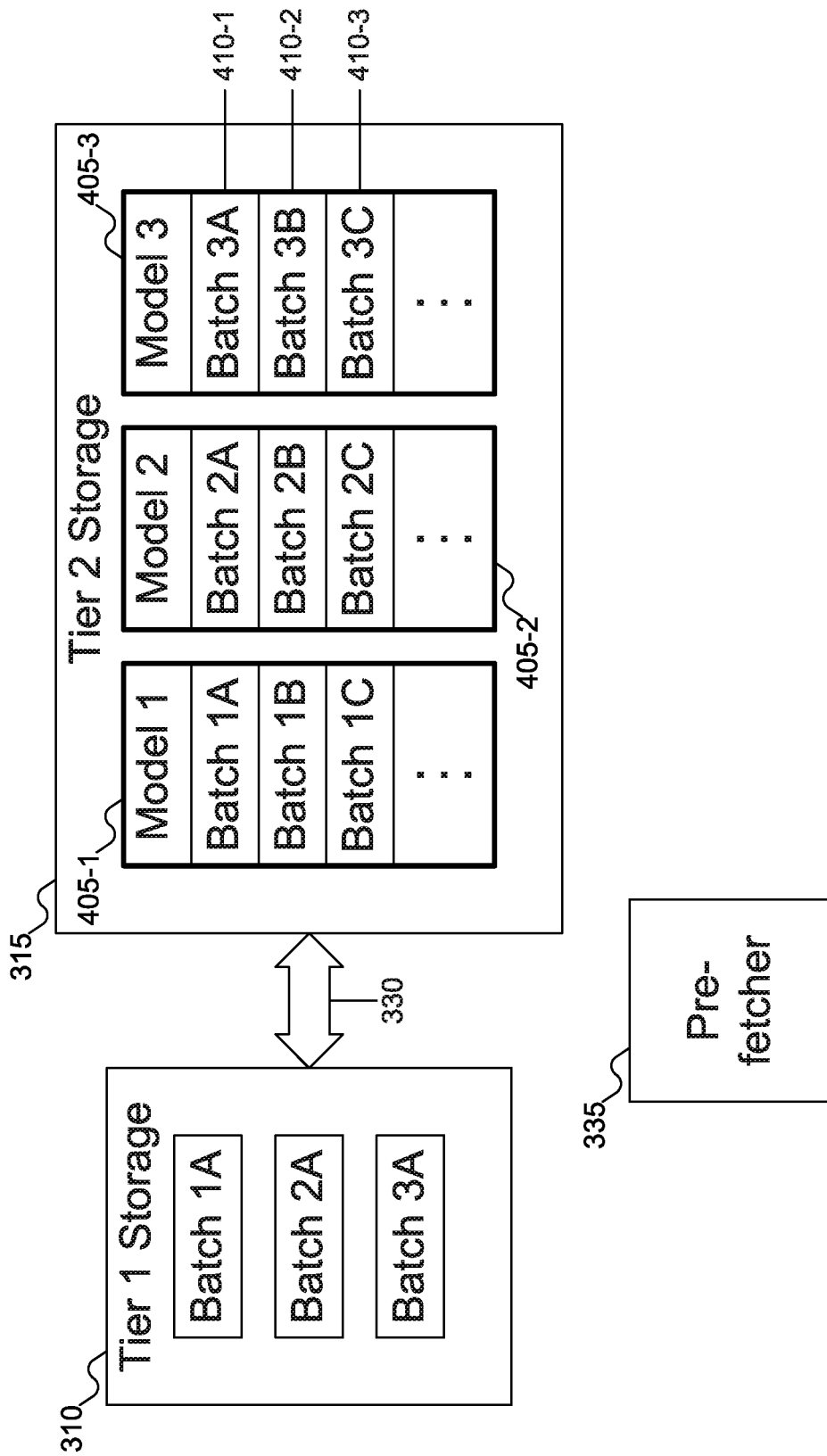
FIG. 4 shows batches of data being moved between the tiers of FIG. 3, according to embodiments of the disclosure.

FIG. 4 shows batches of data being moved between storage tiers 310 and 315 of FIG. 3, according to embodiments of the disclosure. In FIG. 4, second storage tier 315 may store data for various models. In FIG. 4, three models 405-1, 405-2, and 405-3 (which may be referred to collectively as models 405) are shown, but embodiments of the disclosure may support any number (one or more) of models 405.

Each model may include batches of data. For example, model 405-3 is shown as including batches 410-1, 410-2, and 410-3 (which may be referred to collectively as batches 410). While FIG. 4 shows model 405-1 through 405-3 as each including three batches 410 of data, embodiments of the disclosure may have models 405 including any number (one or more) of batches 410 of data. Further, embodiments of the disclosure may have different numbers of batches 410 of data in each of models 405: models 405 are not required to have the same number of batches 410 of data.

Prefetcher 335 may identify batches 410 to be used in executing models 405 by circuit 305 of FIG. 3. For example, prefetcher 335 may know that batches 410 may be used in order, and that only one batch 410 of data may be needed for each model 405 for part of a given execution. Thus, rather than storing an entire model 405 in first tier storage 310, individual batches 410 of models 405 may be stored in first tier storage 310, with later batches 410 fetched when needed. Thus, FIG. 4 shows three batches 410 in first tier storage 310. When execution of batch 1A of model 405-1 is complete, batch 1B of model 405-1 may be loaded into first tier storage 310; similarly, batches 410 of models 405-2 and 405-3 may be loaded into first tier storage 310 as needed. Prefetcher 335 may use high bandwidth bus 330 to load batches 410 into first tier storage 310. Prefetcher 335 may thus ensure that there is data available from each model 405 being executed by circuit 305 of FIG. 3, to maximize execution efficiency.

Prefetcher 335 may use hints to determine which batch 410 to load next into first tier storage 310. For example, when a model is designed, information about how the model is to be executed may be provided to prefetcher 335. Prefetcher 335 may then use these hints to select the next batch 410 of data to be loaded into first tier storage 310.

Figure 5:
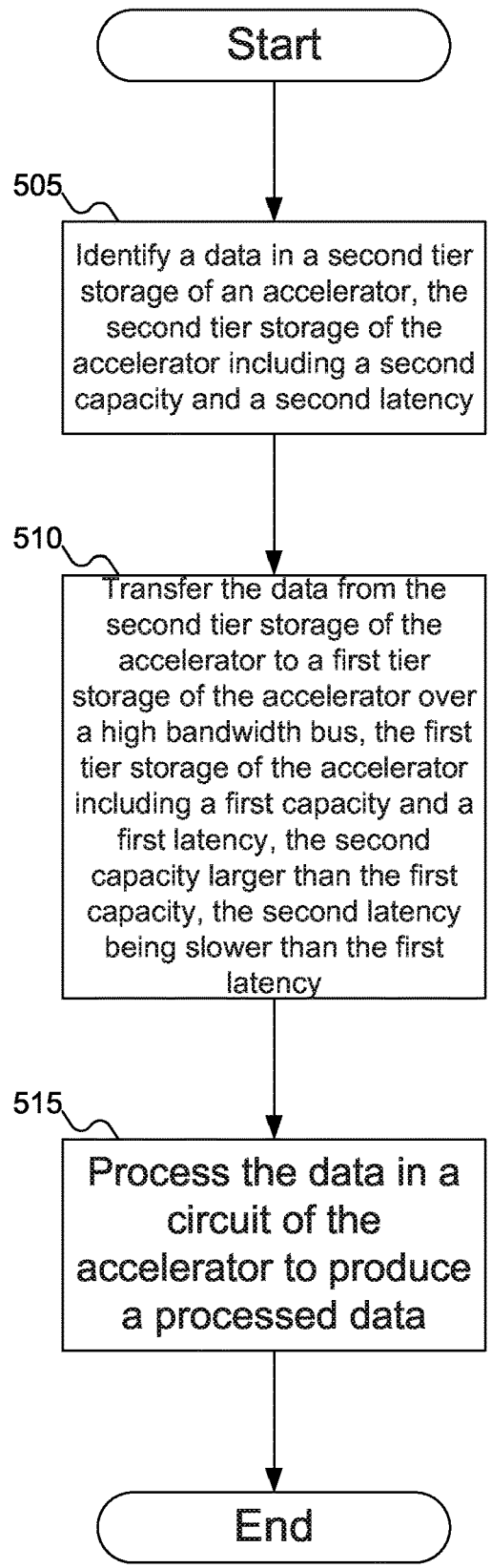
FIG. 5 shows a flowchart of an example procedure to use the accelerator of FIG. 1 to execute models, according to an embodiment of the disclosure.

FIG. 5 shows a flowchart of an example procedure to use accelerator 135 of FIG. 1 to execute models, according to an embodiment of the disclosure. In FIG. 5, at block 505, accelerator 135 of FIG. 1 may identify a data in second tier storage 315 of FIG. 3. Second tier storage 315 of FIG. 3 may have a latency and a capacity. At block 510, accelerator 135 of FIG. 1 may transfer the data from second tier storage 315 of FIG. 3 to first tier storage 310 of FIG. 3 over high bandwidth bus 330. First tier storage 310 of FIG. 3 may have a latency and a capacity: the capacity of second tier storage 315 of FIG. 3 may be larger than the capacity of first tier storage 310, but the latency of second tier storage 315 of FIG. 3 may also be higher (that is, slower) than the latency of first tier storage 310 of FIG. 3. Finally, at block 515, circuit 305 of FIG. 3 may process the data, thereby producing a processed data.

FIG. 6 shows a flowchart of an example procedure to transfer data between storage tiers 310 and 315 of FIG. 3, according to embodiments of the disclosure. In FIG. 6, there might be more than two storage tiers 310 and 315 of FIG. 3, and the data in question might be in the third tier storage. Thus, at block 605, accelerator 135 of FIG. 1 may identify data in the third tier storage of accelerator 135 of FIG. 1, and at block 610 accelerator 135 of FIG. 1 may transfer the data from the third tier storage of accelerator 135 of FIG. 1 to second tier storage 315 of FIG. 3, so that the data may later be transferred to first tier storage 310 of FIG. 3. (Of course, accelerator 135 of FIG. 1 may also transfer the data directly from the third tier storage to first tier storage 310 of FIG. 3.)

FIG. 7 shows a flowchart of an example procedure for prefetcher 335 of FIG. 3 to prefetch data, according to embodiments of the disclosure. In FIG. 7, at block 705, prefetcher 335 of FIG. 3 may identify data, such as blocks 410 of FIG. 4, to be used in executing models 405 of FIG. 4 in accelerator 135 of FIG. 1. At block 710, prefetcher 335 of FIG. 3 may then prefetch the data from second tier storage 315 of FIG. 3 into first tier storage 310 of FIG. 3. Note that while FIG. 7 describes prefetcher 335 of FIG. 3 prefetching data from second tier storage 315 of FIG. 3 into first tier storage 310, embodiments of the disclosure may prefetch data from any storage tier, and may store the prefetched data in any storage tier.

Figures 8, 9:
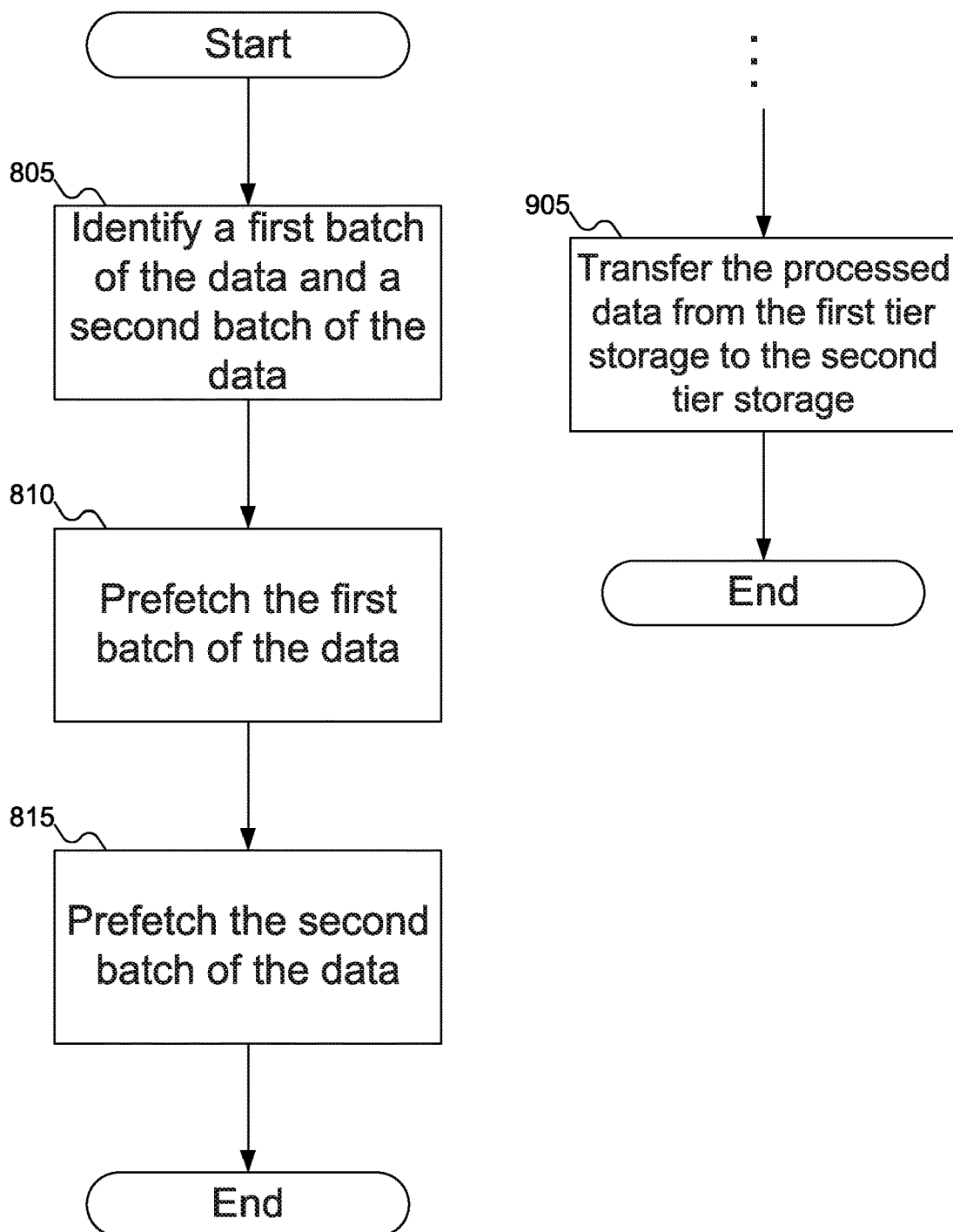
FIG. 8 shows a flowchart of an example procedure for the prefetcher of FIG. 3 to prefetch batches of data, according to embodiments of the disclosure.
FIG. 9 shows a flowchart of an example procedure for the accelerator of FIG. 1 to store data processed by the circuit of FIG. 3, according to embodiments of the disclosure.

FIG. 8 shows a flowchart of an example procedure for prefetcher 335 of FIG. 3 to prefetch batches of data, according to embodiments of the disclosure. In FIG. 8, at block 805, prefetcher 335 of FIG. 3 may identify batches 410 of FIG. 4 of data in models 405 of FIG. 4. At block 810, prefetcher 335 of FIG. 3 may prefetch one batch 410 of FIG. 4 of data for models 405 of FIG. 4. At block 815, prefetcher 335 of FIG. 3 may prefetch a second batch 410 of FIG. 4 of data for models 405 of FIG. 4. Note that block 815 might be performed based on whether or not prefetcher 335 of FIG. 3 expects the second batch 410 of FIG. 4 of data to be needed shortly: for example, prefetcher 335 of FIG. 3 may perform block 815 based on whether or not circuit 305 of FIG. 3 has completed processing the first batch 410 of FIG. 4 of data prefetched in block 810.

FIG. 9 shows a flowchart of an example procedure for accelerator 135 of FIG. 1 to store data processed by the circuit of FIG. 3, according to embodiments of the disclosure. FIG. 9 may be thought of as a continuation of the flowchart of the example procedure shown in FIG. 5. In FIG. 9, at block 905, once circuit 305 of FIG. 3 has finished processing the data as described in block 515 of FIG. 5, accelerator 135 of FIG. 3 may transfer the processed data from first tier storage 310 of FIG. 3 to second tier storage 315 of FIG. 3 (or to any other storage tier that might be available in accelerator 135 of FIG. 1).

Figure 10:
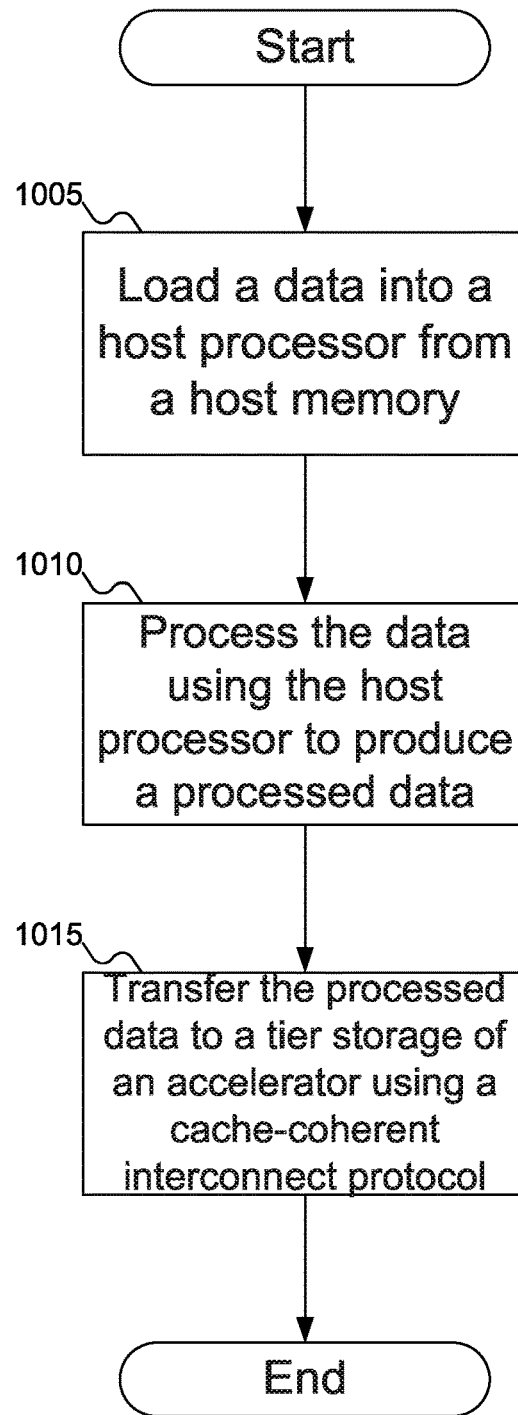
FIG. 10 shows a flowchart of an example procedure for the host of FIG. 1 to preprocess data for use in the accelerator of FIG. 1, according to embodiments of the disclosure.

FIG. 10 shows a flowchart of an example procedure for host 105 of FIG. 1 to preprocess data for use in accelerator 135 of FIG. 1, according to embodiments of the disclosure. In FIG. 10, at block 1005, processor 110 of FIG. 1 may load data into memory 115 of FIG. 1. This data may be loaded from any desired source: storage device 120 of FIG. 1, network interface card 140 of FIG. 1, a network address across network 145 of FIG. 1, or even from tiers 310 or 315 of FIG. 3 in accelerator 135 of FIG. 1 (although in the latter case it might be more efficient for circuit 305 of FIG. 3 to process the data, if that is an option). At block 1010, processor 110 of FIG. 1 may process the data, to produce a processed data. Finally, at block 1015, processor 110 of FIG. 1 may transfer the processed data to a tier storage, such as first tier storage 310 of FIG. 3, in accelerator 135 of FIG. 1. Processor 110 may use a cache-coherent interconnect protocol, such as the CXL protocol, to transfer the processed data into the tier storage of accelerator 135 of FIG. 1.

Figure 11:
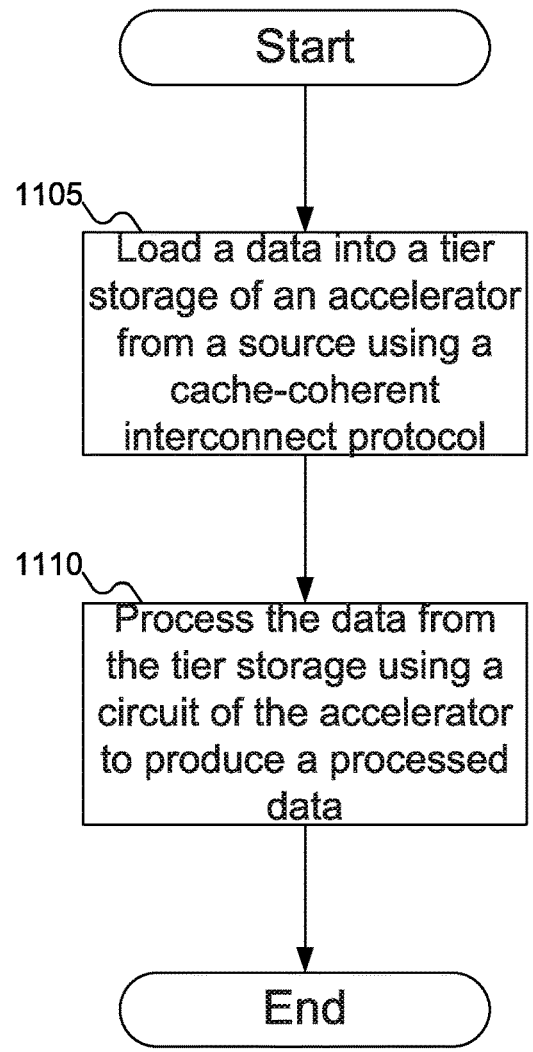
FIG. 11 shows a flowchart of an example procedure for the accelerator of FIG. 1 to preprocess data, according to embodiments of the disclosure.

FIG. 11 shows a flowchart of an example procedure for accelerator 135 of FIG. 1 to preprocess data, according to embodiments of the disclosure. In FIG. 11, at block 1105, accelerator 135 of FIG. 1 may load the data into first tier storage 310 of FIG. 3 from a source. This source may be, for example, memory 115 of FIG. 1, storage device 120 of FIG. 1, network interface card 140 of FIG. 1, a network address across network 145 of FIG. 1, or second tier storage 315 of FIG. 3. Accelerator 135 of FIG. 1 may load the data into first tier storage 310 of FIG. 3 using a cache-coherent interconnect protocol, such as the CXL protocol. At block 1110, circuit 305 of FIG. 3 may process the data from first tier storage 310 of FIG. 3, to produce a processed data.

Figure 12:
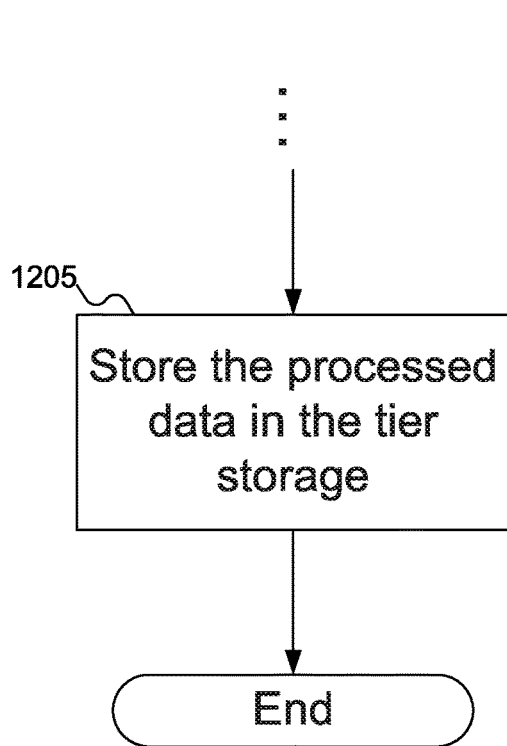
FIG. 12 shows a flowchart of an example procedure for the accelerator of FIG. 1 to store data preprocessed by the circuit of FIG. 3, according to embodiments of the disclosure.

FIG. 12 shows a flowchart of an example procedure for accelerator 135 of FIG. 1 to store data preprocessed by the circuit of FIG. 3, according to embodiments of the disclosure. FIG. 12 may be thought of as a continuation of the flowchart of the example procedure shown in FIG. 11. In FIG. 12, at block 1205, once circuit 305 of FIG. 3 has finished processing the data as described in block 1110 of FIG. 11, accelerator 135 of FIG. 3 may transfer the processed data in first tier storage 310 of FIG. 3 (or in any other storage tier that might be available in accelerator 135 of FIG. 1).

Figure 13:
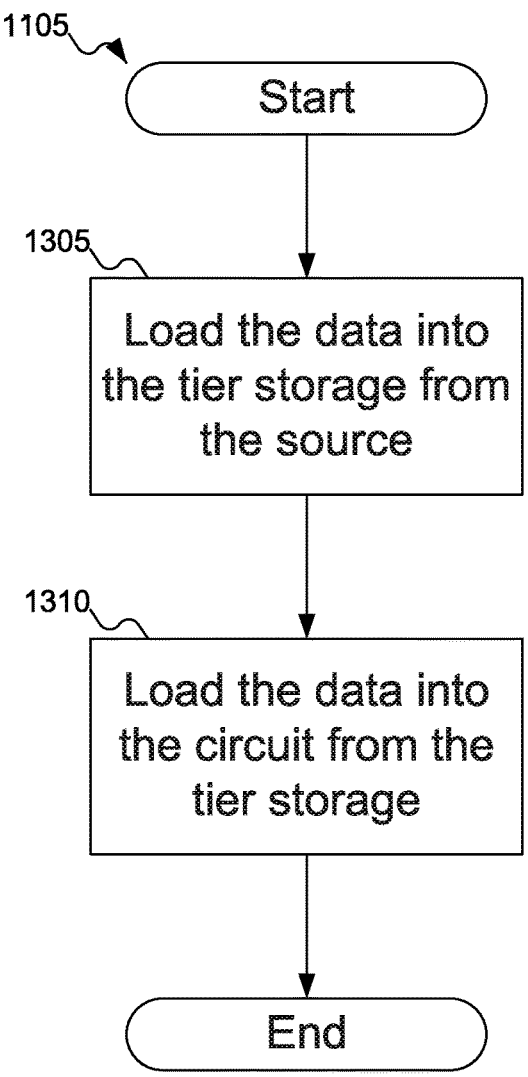
FIG. 13 shows a flowchart of an example procedure for the accelerator of FIG. 1 to load data from the second tier storage of FIG. 3 into the circuit of FIG. 3, according to embodiments of the disclosure.

FIG. 13 shows a flowchart of an example procedure for accelerator 135 of FIG. 1 to load data from second tier storage 315 of FIG. 3 into the circuit of FIG. 3, according to embodiments of the disclosure. In FIG. 13, at block 1305, accelerator 135 of FIG. 1 may load the data from the source into first tier storage 310 of FIG. 3. At block 1310, accelerator 135 of FIG. 1 may load the data from first tier storage 310 of FIG. 3 into circuit 305 of FIG. 3 (or core 320 of FIG. 3) for processing.

In FIGS. 5-13, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include an accelerator. The accelerator may include two tiers of storage, with a high bandwidth bus connecting the two tiers of storage. Data may be moved between the two tiers of storage across the high bandwidth bus, enabling rapid transfer of data for use by a circuit of the accelerator, as well as storage for data not in use. By using a high bandwidth bus between the tiers of storage, embodiments of the disclosure provide a technical advantage over storing data on a separate storage device and transferring data over a bus, such as a Peripheral Component Interconnect Express (PCIe) bus, which may be shared or have a lower bandwidth.

Embodiments of the disclosure may also support using a cache-coherent interconnect protocol, such as the Compute Express Link (CXL) protocol. By using a cache-coherent interconnect protocol, data may be transferred to the accelerator from a source outside the accelerator using fewer operations, providing a technical advantage of a potentially faster data transfer of data into the accelerator.

In Peripheral Component Interconnect Express (PCIe)-based solutions, many large models may be stored on a Solid State Drive (SSD). Model data on the SSD may be cached in host Dynamic Random Access Memory (DRAM) before being copied to accelerator DRAM. Even using a direct path between storage and accelerator, where the model data in the SSD may be directly copied to accelerator DRAM, there may be significant data movement and kernel launch latency delays via PCIe. Due to limited accelerator memory, the CPU may coordinate model execution on the accelerator, one model at a time.

When data is moved from an SSD into an accelerator, there may be data movement and kernel launch latency delays using PCIe. Further, the CPU may coordinate model execution on the accelerator, one model at a time. Concurrent model execution on a PCIe-based solution may involve non-trivial code changes.

Embodiments of the disclosure may leverage CXL tiered memory accelerator for efficient and concurrent kernel execution. A CXL tiered memory accelerator may access data models stored in tier 2 directly (without involving the CPU or other technology).

A CXL tiered memory accelerator that offers higher internal bandwidth between tiers 1 and 2. Hot data cached/moved to tier 1 for faster access by prefetching/auto tiering module.

Embodiments of the disclosure may reduce the amount of data movement and kernel launch latency delays. As compared with PCIe-based solutions, embodiments of the disclosure may avoid an intermediate data copy to the CPU and any bandwidth limits associated with the PCIe bus. Embodiments of the disclosure may avoid stalling kernel execution as data may always be available locally. Embodiments of the disclosure may utilize the high internal bandwidth for data movement between tiers 1 and 2. Overall data latency may be reduced from ($DMA_{media}+DMA_{SSD}+DMA_{acc}$) or ($DMA_{media}+DMA_{SSD}$) to $DMA_{media}$. As the accelerator may have direct access to tiers 1 and 2, embodiments of the disclosure may support seamless concurrent model execution. The CPU utilization may be reduced, as the use of the CPU for data copying may be avoided. Embodiments of the disclosure may offer an improved end-to-end application performance.

A concurrent model coordinator, running on the host processor or in the accelerator, may coordinate model execution and may pass programmer's provided hints for data placement/movement between tiers, to: place data in tier 1 or 2; prefetch data from tier 2 to tier 1; or statically partition tier 1.

Input data pre-processing may be needed before kernel execution in applications such as machine learning (ML). The input data may come from sources such as the network. After pre-processing is executed on host or accelerator, the pre-processed data may be used by an accelerator for kernel execution. In PCIe-based systems, extra data copies may be performed between the accelerator and the host memory to copy input data or pre-processed input to the accelerator memory. The data copy time overhead may significantly impact end-to-end performance.

Embodiments of the disclosure may offer more efficient input data staging using CXL type 2 tiered memory accelerator. Embodiments of the disclosure may support methods for efficient input data staging when preprocessing on the host and when preprocessing on the accelerator with input data stored in different locations (network interface card (NIC), host central processing unit (CPU), Dynamic Random Access Memory (DRAM), tier 2, etc.)

Embodiments of the disclosure may offer lower latency input staging between the host and accelerator DRAM for latency-sensitive use-cases. There may also be fewer data copies overall. Embodiments of the disclosure may exploit a higher internal bandwidth between tiers 1 and 2 in capacity-hungry use-cases. Embodiments of the disclosure may improve end-to-end application performance.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes an accelerator, comprising:
a circuit to process a data to produce a processed data;
a first tier storage including a first capacity and a first latency;
a second tier storage including a second capacity and a second latency, the second capacity larger than the first capacity, the second latency being slower than the first latency; and
a bus to transfer at least one of the data or the processed data between the first tier storage and the second tier storage.

Statement 2. An embodiment of the disclosure includes the accelerator according to statement 1, wherein the accelerator is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), or a system-on-a-chip (SoC).

Statement 3. An embodiment of the disclosure includes the accelerator according to statement 1, wherein the circuit includes a first core and a second core.

Statement 4. An embodiment of the disclosure includes the accelerator according to statement 3, wherein:
the first tier storage is configured to store the data and a second data;
the first core is configured to process the data to produce the processed data; and
the second core is configured to process the second data to produce a second processed data.

Statement 5. An embodiment of the disclosure includes the accelerator according to statement 4, wherein the first core and the second core are configured to operate concurrently.

Statement 6. An embodiment of the disclosure includes the accelerator according to statement 1, wherein the first tier storage is drawn from a set including a dynamic random access memory (DRAM), a static random access memory (SRAM), or a processor cache.

Statement 7. An embodiment of the disclosure includes the accelerator according to statement 1, wherein the second tier storage is drawn from a set including a DRAM, an SRAM, or a storage device.

Statement 8. An embodiment of the disclosure includes the accelerator according to statement 7, wherein the storage device is drawn from a set including a hard disk drive or a Solid State Drive (SSD).

Statement 9. An embodiment of the disclosure includes the accelerator according to statement 1, further comprising a third tier storage including a third capacity and a third latency, the third capacity larger than the second capacity, the third latency being slower than the second latency.

Statement 10. An embodiment of the disclosure includes the accelerator according to statement 9, wherein the bus is configured to transfer a second data between the third tier storage and the second tier storage.

Statement 11. An embodiment of the disclosure includes the accelerator according to statement 10, wherein the bus is further configured to transfer a third data between the third tier storage and the first tier storage.

Statement 12. An embodiment of the disclosure includes the accelerator according to statement 1, wherein the bus includes a bandwidth that is larger than a Peripheral Component Interconnect Express (PCIe) bus bandwidth.

Statement 13. An embodiment of the disclosure includes the accelerator according to statement 1, further comprising a prefetcher.

Statement 14. An embodiment of the disclosure includes the accelerator according to statement 13, wherein the prefetcher is configured to transfer the data from the second tier storage to the first tier storage over the bus.

Statement 15. An embodiment of the disclosure includes the accelerator according to statement 14, wherein:
the data includes a first batch of the data and a second batch of the data; and
the prefetcher is configured to transfer the first batch of the data from the second tier storage to the first tier storage over the bus.

Statement 16. An embodiment of the disclosure includes the accelerator according to statement 15, wherein the prefetcher is configured to transfer the second batch of the data from the second tier storage to the first tier storage based at least in part on the circuit processing the first batch of the data.

Statement 17. An embodiment of the disclosure includes the accelerator according to statement 13, wherein the prefetcher is configured to use a hint from a host to select the data for transfer from the second tier storage to the first tier storage.

Statement 18. An embodiment of the disclosure includes the accelerator according to statement 1, wherein the bus is configured to transfer the processed data from the first tier storage to the second tier storage.

Statement 19. An embodiment of the disclosure includes the accelerator according to statement 1, further comprising a coordinator.

Statement 20. An embodiment of the disclosure includes the accelerator according to statement 19, wherein the coordinator is configured to identify the data for prefetching.

Statement 21. An embodiment of the disclosure includes the accelerator according to statement 20, wherein the coordinator is further configured to instruct the circuit to process the data.

Statement 22. An embodiment of the disclosure includes the accelerator according to statement 1, wherein a host includes the coordinator.

Statement 23. An embodiment of the disclosure includes a method, comprising:
 identifying a data in a second tier storage of an accelerator, the second tier storage of the accelerator including a second capacity and a second latency;
 transferring the data from the second tier storage of the accelerator to a first tier storage of the accelerator over a bus, the first tier storage of the accelerator including a first capacity and a first latency, the second capacity larger than the first capacity, the second latency being slower than the first latency; and
 processing the data in a circuit of the accelerator to produce a processed data.

Statement 24. An embodiment of the disclosure includes the method according to statement 23, wherein the accelerator is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), or a system-on-a-chip (SoC).

Statement 25. An embodiment of the disclosure includes the method according to statement 23, wherein:
 processing the data in the circuit of the accelerator to produce the processed data includes processing the data in a first core of the circuit of the accelerator to produce the processed data; and
 the method further comprises:
  identifying a second data in the second tier storage of the accelerator;
  transferring the second data from the second tier storage of the accelerator to second first tier storage of the accelerator over a second bus; and
  processing the second data in a second core of the circuit of the accelerator to produce a second processed data.

Statement 26. An embodiment of the disclosure includes the method according to statement 25, wherein processing the second data in the second core of the circuit of the accelerator to produce the second processed data includes processing the second data in the second core of the circuit of the accelerator to produce the second processed data concurrently with processing the data in the first core of the circuit of the accelerator to produce the processed data.

Statement 27. An embodiment of the disclosure includes the method according to statement 23, wherein the first tier storage is drawn from a set including a dynamic random access memory (DRAM), a static random access memory (SRAM), or a processor cache.

Statement 28. An embodiment of the disclosure includes the method according to statement 23, wherein the second tier storage is drawn from a set including a DRAM, an SRAM, or a storage device.

Statement 29. An embodiment of the disclosure includes the method according to statement 28, wherein the storage device is drawn from a set including a hard disk drive or a Solid State Drive (SSD).

Statement 30. An embodiment of the disclosure includes the method according to statement 23, further comprising:
 identifying the data in a third tier storage of the accelerator, the third tier storage including a third capacity and a third latency, the third capacity larger than the second capacity, the third latency being slower than the second latency; and
 transferring the data from the third tier storage of the accelerator to the second tier storage of the accelerator.

Statement 31. An embodiment of the disclosure includes the method according to statement 30, wherein transferring the data from the third tier storage of the accelerator to the second tier storage of the accelerator includes transferring the data from the third tier storage of the accelerator to the second tier storage of the accelerator over the bus.

Statement 32. An embodiment of the disclosure includes the method according to statement 30, wherein the bus includes a bandwidth that is larger than a Peripheral Component Interconnect Express (PCIe) bus bandwidth.

Statement 33. An embodiment of the disclosure includes the method according to statement 23, wherein transferring the data from the second tier storage of the accelerator to a first tier storage of the accelerator over the bus includes prefetching the data from the second tier storage of the accelerator to the first tier storage of the accelerator.

Statement 34. An embodiment of the disclosure includes the method according to statement 33, wherein prefetching the data from the second tier storage of the accelerator to the first tier storage of the accelerator includes prefetching the data from the second tier storage of the accelerator to the first tier storage of the accelerator over the bus.

Statement 35. An embodiment of the disclosure includes the method according to statement 33, wherein prefetching the data from the second tier storage of the accelerator to the first tier storage of the accelerator includes:
 identifying a first batch of the data in the data and a second batch of the data in the data; and
 prefetching the first batch of the data from the second tier storage of the accelerator to the first tier storage of the accelerator.

Statement 36. An embodiment of the disclosure includes the method according to statement 35, wherein prefetching the data from the second tier storage of the accelerator to the first tier storage of the accelerator further includes prefetching the second batch of the data from the second tier storage of the accelerator to the first tier storage of the accelerator based at least in part on processing of the first batch of data by the circuit of the accelerator.

Statement 37. An embodiment of the disclosure includes the method according to statement 33, wherein prefetching the data from the second tier storage of the accelerator to the first tier storage of the accelerator includes prefetching the data from the second tier storage of the accelerator to the first tier storage of the accelerator based at least in part on a hint from a host.

Statement 38. An embodiment of the disclosure includes the method according to statement 33, wherein prefetching the data from the second tier storage of the accelerator to the first tier storage of the accelerator includes prefetching the data from the second tier storage of the accelerator to the first tier storage of the accelerator based at least in part on a signal from a coordinator.

Statement 39. An embodiment of the disclosure includes the method according to statement 23, further comprising transferring the processed data from the first tier storage of the accelerator to the second tier storage of the accelerator.

Statement 40. An embodiment of the disclosure includes the method according to statement 23, wherein:
transferring the data from the second tier storage of the accelerator to the first tier storage of the accelerator over the bus includes transferring the data from the second tier storage of the accelerator to the first tier storage of the accelerator over the bus based at least in part on a first signal from a coordinator; and
processing the data in a circuit of the accelerator to produce the processed data includes processing the data in a circuit of the accelerator to produce the processed data based at least in part on a second signal from a coordinator.

Statement 41. An embodiment of the disclosure includes the method according to statement 40, wherein the accelerator includes the coordinator.

Statement 42. An embodiment of the disclosure includes the method according to statement 40, wherein a host includes the coordinator.

Statement 43. An embodiment of the disclosure includes an article, comprising a non-transitory storage medium, the non-transitory storage medium having stored thereon instructions that, when executed by a machine, result in:
identifying a data in a second tier storage of an accelerator, the second tier storage of the accelerator including a second capacity and a second latency;
transferring the data from the second tier storage of the accelerator to a first tier storage of the accelerator over a bus, the first tier storage of the accelerator including a first capacity and a first latency, the second capacity larger than the first capacity, the second latency being slower than the first latency; and
processing the data in a circuit of the accelerator to produce a processed data.

Statement 44. An embodiment of the disclosure includes the article according to statement 43, wherein the accelerator is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), or a system-on-a-chip (SoC).

Statement 45. An embodiment of the disclosure includes the article according to statement 43, wherein:
processing the data in the circuit of the accelerator to produce the processed data includes processing the data in a first core of the circuit of the accelerator to produce the processed data; and
the non-transitory storage medium has stored thereon further instructions that, when executed by the machine, result in:
identifying a second data in the second tier storage of the accelerator;
transferring the second data from the second tier storage of the accelerator to second first tier storage of the accelerator over a second bus; and
processing the second data in a second core of the circuit of the accelerator to produce a second processed data.

Statement 46. An embodiment of the disclosure includes the article according to statement 45, wherein processing the second data in the second core of the circuit of the accelerator to produce the second processed data includes processing the second data in the second core of the circuit of the accelerator to produce the second processed data concurrently with processing the data in the first core of the circuit of the accelerator to produce the processed data.

Statement 47. An embodiment of the disclosure includes the article according to statement 43, wherein the first tier storage is drawn from a set including a dynamic random access memory (DRAM), a static random access memory (SRAM), or a processor cache.

Statement 48. An embodiment of the disclosure includes the article according to statement 43, wherein the second tier storage is drawn from a set including a DRAM, an SRAM, or a storage device.

Statement 49. An embodiment of the disclosure includes the article according to statement 48, wherein the storage device is drawn from a set including a hard disk drive or a Solid State Drive (SSD).

Statement 50. An embodiment of the disclosure includes the article according to statement 43, the non-transitory storage medium having stored thereon further instructions that, when executed by the machine, result in:
identifying the data in a third tier storage of the accelerator, the third tier storage including a third capacity and a third latency, the third capacity larger than the second capacity, the third latency being slower than the second latency; and
transferring the data from the third tier storage of the accelerator to the second tier storage of the accelerator.

Statement 51. An embodiment of the disclosure includes the article according to statement 50, wherein transferring the data from the third tier storage of the accelerator to the second tier storage of the accelerator includes transferring the data from the third tier storage of the accelerator to the second tier storage of the accelerator over the bus.

Statement 52. An embodiment of the disclosure includes the article according to statement 50, wherein the bus includes a bandwidth that is larger than a Peripheral Component Interconnect Express (PCIe) bus bandwidth.

Statement 53. An embodiment of the disclosure includes the article according to statement 43, wherein transferring the data from the second tier storage of the accelerator to a first tier storage of the accelerator over the bus includes prefetching the data from the second tier storage of the accelerator to the first tier storage of the accelerator.

Statement 54. An embodiment of the disclosure includes the article according to statement 53, wherein prefetching the data from the second tier storage of the accelerator to the first tier storage of the accelerator includes prefetching the data from the second tier storage of the accelerator to the first tier storage of the accelerator over the bus.

Statement 55. An embodiment of the disclosure includes the article according to statement 53, wherein prefetching the data from the second tier storage of the accelerator to the first tier storage of the accelerator includes:
identifying a first batch of the data in the data and a second batch of the data in the data; and
prefetching the first batch of the data from the second tier storage of the accelerator to the first tier storage of the accelerator.

Statement 56. An embodiment of the disclosure includes the article according to statement 55, wherein prefetching the data from the second tier storage of the accelerator to the first tier storage of the accelerator further includes prefetching the second batch of the data from the second tier storage of the accelerator to the first tier storage of the accelerator based at least in part on processing of the first batch of data by the circuit of the accelerator.

Statement 57. An embodiment of the disclosure includes the article according to statement 53, wherein prefetching the data from the second tier storage of the accelerator to the first tier storage of the accelerator includes prefetching the data from the second tier storage of the accelerator to the first tier storage of the accelerator based at least in part on a hint from a host.

Statement 58. An embodiment of the disclosure includes the method according to statement 53, wherein prefetching the data from the second tier storage of the accelerator to the first tier storage of the accelerator includes prefetching the data from the second tier storage of the accelerator to the first tier storage of the accelerator based at least in part on a signal from a coordinator.

Statement 59. An embodiment of the disclosure includes the article according to statement 43, the non-transitory storage medium having stored thereon further instructions that, when executed by the machine, result in transferring the processed data from the first tier storage of the accelerator to the second tier storage of the accelerator.

Statement 60. An embodiment of the disclosure includes the article according to statement 43, wherein:
transferring the data from the second tier storage of the accelerator to the first tier storage of the accelerator over the bus includes transferring the data from the second tier storage of the accelerator to the first tier storage of the accelerator over the bus based at least in part on a first signal from a coordinator; and
processing the data in a circuit of the accelerator to produce the processed data includes processing the data in a circuit of the accelerator to produce the processed data based at least in part on a second signal from a coordinator.

Statement 61. An embodiment of the disclosure includes the article according to statement 60, wherein the accelerator includes the coordinator.

Statement 62. An embodiment of the disclosure includes the article according to statement 60, wherein a host includes the coordinator.

Statement 63. An embodiment of the disclosure includes a system, comprising:
a host memory, storing a data;
a host processor to process the data to produce a processed data; and
an accelerator, including:
a circuit to process the processed data; and
a tier storage for the processed data;
wherein the host processor may transfer the processed data to the tier storage of the accelerator using a cache-coherent interconnect protocol.

Statement 64. An embodiment of the disclosure includes the system according to statement 63, wherein the accelerator is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), or a system-on-a-chip (SoC).

Statement 65. An embodiment of the disclosure includes the system according to statement 63, wherein the host processor is configured to transfer the processed data to the tier storage of the accelerator without storing the processed data in a pinned memory of the host memory.

Statement 66. An embodiment of the disclosure includes the system according to statement 63, wherein the cache-coherent interconnect protocol includes a Compute Express Link (CXL) protocol.

Statement 67. An embodiment of the disclosure includes the system according to statement 63, wherein the host processor may transfer the processed data to the accelerator without using a Peripheral Component Interconnect Express (PCIe) bus.

Statement 68. An embodiment of the disclosure includes an accelerator, comprising:
a tier storage; and
a circuit to process a data to produce a processed data and to store the processed data in the tier storage,
wherein the accelerator is configured to load the data from a device using a cache-coherent interconnect protocol.

Statement 69. An embodiment of the disclosure includes the accelerator according to statement 68, wherein the accelerator is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), or a system-on-a-chip (SoC).

Statement 70. An embodiment of the disclosure includes the accelerator according to statement 68, wherein the device is outside the accelerator.

Statement 71. An embodiment of the disclosure includes the accelerator according to statement 68, wherein the device is drawn from a set including a host memory, a network interface card, a network address, or a second tier storage.

Statement 72. An embodiment of the disclosure includes the accelerator according to statement 71, wherein the tier storage is drawn from a set including a DRAM, an SRAM, a hard disk drive, or a Solid State Drive (SSD).

Statement 73. An embodiment of the disclosure includes the accelerator according to statement 68, wherein the cache-coherent interconnect protocol includes a Compute Express Link (CXL) protocol.

Statement 74. An embodiment of the disclosure includes the accelerator according to statement 68, wherein the circuit includes a first core and a second core.

Statement 75. An embodiment of the disclosure includes the accelerator according to statement 74, wherein:
the first core is configured to process the data to produce the processed data; and
the second core is configured to process a second data to produce a second processed data.

Statement 76. An embodiment of the disclosure includes the accelerator according to statement 75, wherein the first core and the second core are configured to operate concurrently.

Statement 77. An embodiment of the disclosure includes the accelerator according to statement 68, wherein the tier storage is drawn from a set including a dynamic random access memory (DRAM), a static random access memory (SRAM), or a processor cache.

Statement 78. An embodiment of the disclosure includes the accelerator according to statement 68, wherein:
the accelerator further comprises a memory controller; and the circuit is configured to use the memory controller to store the processed data in the tier storage.

Statement 79. An embodiment of the disclosure includes the accelerator according to statement 68, wherein:
the accelerator is configured to load the data from the device into the tier storage using the cache-coherent interconnect protocol; and
the circuit of the accelerator is configured to access the data from the tier storage of the accelerator.

Statement 80. An embodiment of the disclosure includes the accelerator according to statement 68, wherein the accelerator is configured to load the data from the device into the circuit using the cache-coherent interconnect protocol.

Statement 81. An embodiment of the disclosure includes a method, comprising:
loading a data into a host processor from a host memory;
processing the data using the host processor to produce a processed data; and
transferring the processed data to a tier storage of an accelerator using a cache-coherent interconnect protocol.

Statement 82. An embodiment of the disclosure includes the method according to statement 81, wherein the accelerator is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), or a system-on-a-chip (SoC).

Statement 83. An embodiment of the disclosure includes the method according to statement 81, wherein transferring the processed data to the tier storage of the accelerator using the cache-coherent interconnect protocol includes transferring the processed data to the tier storage of the accelerator without storing the processed data in a pinned memory of the host memory.

Statement 84. An embodiment of the disclosure includes the method according to statement 81, wherein the cache-coherent interconnect protocol includes a Compute Express Link (CXL) protocol.

Statement 85. An embodiment of the disclosure includes the method according to statement 81, wherein transferring the processed data to the tier storage of the accelerator using the cache-coherent interconnect protocol includes transferring the processed data to the tier storage of the accelerator without using a Peripheral Component Interconnect Express (PCIe) bus.

Statement 86. An embodiment of the disclosure includes a method, comprising:
loading a data into a tier storage of an accelerator from a device using a cache-coherent interconnect protocol; and
processing the data from the tier storage using a circuit of the accelerator to produce a processed data.

Statement 87. An embodiment of the disclosure includes the article according to statement 86, wherein the accelerator is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), or a system-on-a-chip (SoC).

Statement 88. An embodiment of the disclosure includes the method according to statement 86, wherein the device is drawn from a set including a host memory, a network interface card, a network address, or a second tier storage.

Statement 89. An embodiment of the disclosure includes the method according to statement 86, wherein loading the data into the tier storage of the accelerator from the device using the cache-coherent interconnect protocol includes loading the data into the tier storage of the accelerator from the device outside the accelerator using the cache-coherent interconnect protocol.

Statement 90. An embodiment of the disclosure includes the method according to statement 86, wherein the tier storage is drawn from a set including a DRAM, an SRAM, a hard disk drive, or a Solid State Drive (SSD).

Statement 91. An embodiment of the disclosure includes the method according to statement 86, wherein the cache-coherent interconnect protocol includes a Compute Express Link (CXL) protocol.

Statement 92. An embodiment of the disclosure includes the method according to statement 86, wherein:
loading the data into the tier storage of the accelerator from the device using the cache-coherent interconnect protocol includes:
loading the data into the tier storage of the accelerator;
loading a second data into the tier storage of the circuit of the accelerator; and
processing the data using the circuit of the accelerator to produce the processed data includes:
processing the data using a first core of the circuit of the accelerator to produce the processed data; and
processing the second data using a second core of the circuit of the accelerator to produce a second processed data.

Statement 93. An embodiment of the disclosure includes the method according to statement 92, wherein processing the second data using the second core of the circuit of the accelerator to produce the second processed data includes processing the second data using the second core of the circuit of the accelerator to produce the second processed data concurrently with processing the data using the first core of the circuit of the accelerator to produce the processed data.

Statement 94. An embodiment of the disclosure includes the method according to statement 86, wherein the tier storage is drawn from a set including a dynamic random access memory (DRAM), a static random access memory (SRAM), or a processor cache.

Statement 95. An embodiment of the disclosure includes the method according to statement 86, further comprising storing the processed data in the tier storage of the accelerator by the circuit of the accelerator.

Statement 96. An embodiment of the disclosure includes the method according to statement 95, wherein storing the processed data in the tier storage of the accelerator by the circuit of the accelerator includes storing the processed data in the tier storage of the accelerator by the circuit of the accelerator using a memory controller of the accelerator.

Statement 97. An embodiment of the disclosure includes the method according to statement 86, wherein loading the data into the tier storage of the accelerator from the device using the cache-coherent interconnect protocol includes loading the data into the circuit of the accelerator from the tier storage of the accelerator.

Statement 98. An embodiment of the disclosure includes an article, comprising a non-transitory storage medium, the non-transitory storage medium having stored thereon instructions that, when executed by a machine, result in:
loading a data into a host processor from a host memory;
processing the data using the host processor to produce a processed data; and transferring the processed data to a tier storage of an accelerator using a cache-coherent interconnect protocol.

Statement 99. An embodiment of the disclosure includes the article according to statement 98, wherein the accelerator is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), or a system-on-a-chip (SoC).

Statement 100. An embodiment of the disclosure includes the article according to statement 98, wherein transferring the processed data to the tier storage of the accelerator using the cache-coherent interconnect protocol includes transferring the processed data to the tier storage of the accelerator without storing the processed data in a pinned memory of the host memory.

Statement 101. An embodiment of the disclosure includes the article according to statement 98, wherein the cache-coherent interconnect protocol includes a Compute Express Link (CXL) protocol.

Statement 102. An embodiment of the disclosure includes the article according to statement 98, wherein transferring the processed data to the tier storage of the accelerator using the cache-coherent interconnect protocol includes transferring the processed data to the tier storage of the accelerator without using a Peripheral Component Interconnect Express (PCIe) bus.

Statement 103. An embodiment of the disclosure includes an article, comprising a non-transitory storage medium, the non-transitory storage medium having stored thereon instructions that, when executed by a machine, result in:
loading a data into a tier storage of an accelerator from a device using a cache-coherent interconnect protocol; and
processing the data from the tier storage using a circuit of the accelerator to produce a processed data.

Statement 104. An embodiment of the disclosure includes the article according to statement 103, wherein the accelerator is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), or a system-on-a-chip (SoC).

Statement 105. An embodiment of the disclosure includes the article according to statement 103, wherein the device is drawn from a set including a host memory, a network interface card, a network address, or a second tier storage.

Statement 106. An embodiment of the disclosure includes the article according to statement 103, wherein loading the data into the tier storage of the accelerator from the device using the cache-coherent interconnect protocol includes loading the data into the tier storage of the accelerator from the device outside the accelerator using the cache-coherent interconnect protocol.

Statement 107. An embodiment of the disclosure includes the article according to statement 103, wherein the tier storage is drawn from a set including a DRAM, an SRAM, a hard disk drive, or a Solid State Drive (SSD).

Statement 108. An embodiment of the disclosure includes the article according to statement 103, wherein the cache-coherent interconnect protocol includes a Compute Express Link (CXL) protocol.

Statement 109. An embodiment of the disclosure includes the article according to statement 103, wherein:

loading the data into the tier storage of the accelerator from the device using the cache-coherent interconnect protocol includes:
loading the data into the tier storage of the accelerator;
loading a second data into the tier storage of the circuit of the accelerator; and
processing the data using the circuit of the accelerator to produce the processed data includes:
processing the data using a first core of the circuit of the accelerator to produce the processed data; and
processing the second data using a second core of the circuit of the accelerator to produce a second processed data.

Statement 110. An embodiment of the disclosure includes the article according to statement 109, wherein processing the second data using the second core of the circuit of the accelerator to produce the second processed data includes processing the second data using the second core of the circuit of the accelerator to produce the second processed data concurrently with processing the data using the first core of the circuit of the accelerator to produce the processed data.

Statement 111. An embodiment of the disclosure includes the article according to statement 103, wherein the tier storage is drawn from a set including a dynamic random access memory (DRAM), a static random access memory (SRAM), or a processor cache.

Statement 112. An embodiment of the disclosure includes the article according to statement 103, the non-transitory storage medium having stored thereon further instructions that, when executed by the machine, result in storing the processed data in the tier storage of the accelerator by the circuit of the accelerator.

Statement 113. An embodiment of the disclosure includes the article according to statement 112, wherein storing the processed data in the tier storage of the accelerator by the circuit of the accelerator includes storing the processed data in the tier storage of the accelerator by the circuit of the accelerator using a memory controller of the accelerator.

Statement 114. An embodiment of the disclosure includes the article according to statement 103, wherein loading the data into the tier storage of the accelerator from the device using the cache-coherent interconnect protocol includes loading the data into the circuit of the accelerator from the tier storage of the accelerator.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:
1. An accelerator, comprising:
a first tier storage including a first capacity and a first latency;
a second tier storage including a second capacity and a second latency, the second capacity larger than the first capacity, the second latency slower than the first latency; and
a circuit, the circuit including a first core and a second core, wherein:
the first core is configured to process a first data to produce a second data for processing using a machine learning model, to process the second data using the machine learning model to produce a processed data, and to store the processed data in the first tier storage; and the second core is configured to process a third data to produce a fourth data for processing using a machine learning model, to process the fourth data using the machine learning model to produce a second processed data, and to store the second processed data in the first tier storage, wherein the accelerator is configured to load the first data and the third data into the second tier storage from a device using a cache-coherent interconnect protocol and to load the first data and the third data into the first tier storage from the second tier storage.

2. The accelerator according to claim 1, wherein the accelerator is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), or a system-on-a-chip (SoC).

3. The accelerator according to claim 1, wherein the device is outside the accelerator.

4. The accelerator according to claim 1, wherein the device is drawn from a set including a host memory, a network interface card, or a network address.

5. The accelerator according to claim 1, wherein:
the accelerator further comprises a memory controller; and
the circuit is configured to use the memory controller to store the processed data in the first tier storage.

6. The accelerator according to claim 1, wherein the circuit of the accelerator is configured to access the first data from the first tier storage of the accelerator.

7. The accelerator according to claim 1, wherein the accelerator is configured to load the first data from the device into the circuit using the cache-coherent interconnect protocol.

8. A method, comprising:
loading a first data into a host processor from a host memory;
processing the first data using the host processor to produce a second data;
transferring the second data into a second tier storage of an accelerator by the accelerator using a cache-coherent interconnect protocol, the second tier storage including a second capacity and a second latency;
loading a third data into the host processor from the host memory;
processing the third data using the host processor to produce a fourth data;
transferring the fourth data into the second tier storage of the accelerator by the accelerator using a cache-coherent interconnect protocol; and
transferring the second data and the fourth data from the second tier storage into a first tier storage of the accelerator, the first tier storage including a first capacity and a first latency, the second capacity larger than the first capacity, the second latency slower than the first latency,
wherein the accelerator is configured to use a first core to process the second data using a machine learning model to produce a first processed data and to use a second core to process the fourth data using the machine learning model to produce a second processed data.

9. The method according to claim 8, wherein the cache-coherent interconnect protocol includes a Compute Express Link (CXL) protocol.

10. A method, comprising:
loading a first data from a device into a second tier storage of an accelerator by the accelerator using a cache-coherent interconnect protocol, the second tier storage including a second capacity and a second latency;
loading the first data from the second tier storage of the accelerator into a first tier storage of the accelerator, the first tier storage including a first capacity and a first latency, the second capacity larger than the first capacity, the second latency slower than the first latency;
processing the first data using the accelerator to produce a second data for processing using a machine learning model;
processing the second data from the first tier storage using a first core of a circuit of the accelerator using the machine learning model to produce a processed data;
loading a third data from the device into the second tier storage of the accelerator by the accelerator using the cache-coherent interconnect protocol;
loading the third data into the first tier storage of the circuit of the accelerator;
processing the third data using the accelerator to produce a fourth data for processing using a machine learning model; and
processing the fourth data from the first tier storage using a second core of the circuit of the accelerator using the machine learning model to produce a second processed data.

11. The method according to claim 10, wherein the accelerator is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), or a system-on-a-chip (SoC).

12. The method according to claim 10, wherein the device is drawn from a set including a host memory, a network interface card, or a network address.

13. The method according to claim 10, wherein the cache-coherent interconnect protocol includes a Compute Express Link (CXL) protocol.

14. The method according to claim 10, wherein the first tier storage is drawn from a set including a dynamic random access memory (DRAM), a static random access memory (SRAM), or a processor cache.

15. The method according to claim 10, further comprising storing the processed data in the first tier storage of the accelerator by the circuit of the accelerator.

16. The method according to claim 15, wherein storing the processed data in the first tier storage of the accelerator by the circuit of the accelerator includes storing the processed data in the first tier storage of the accelerator by the circuit of the accelerator using a memory controller of the accelerator.

17. The method according to claim 10, wherein loading the first data from the second tier storage of the accelerator into the first tier storage of the accelerator by the accelerator includes loading the first data into the circuit of the accelerator from the first tier storage of the accelerator by the accelerator.

* * * * *